Dec. 30, 1930.  E. J. J. MUELLER  1,787,015
POULTRY DRINKING FOUNTAIN
Filed May 9, 1929  2 Sheets-Sheet 1
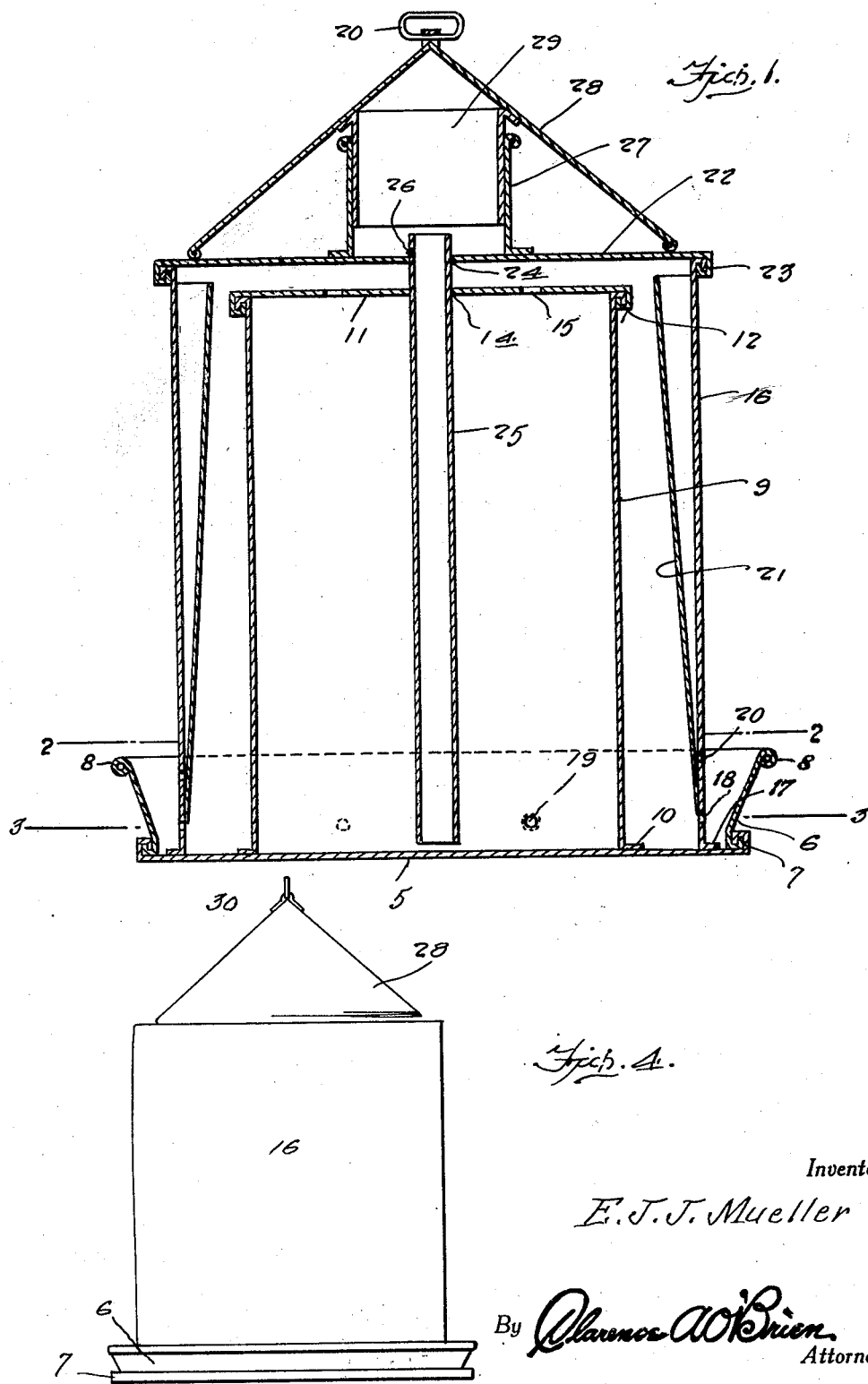
Inventor
E. J. J. Mueller
By Clarence A. O'Brien
Attorney

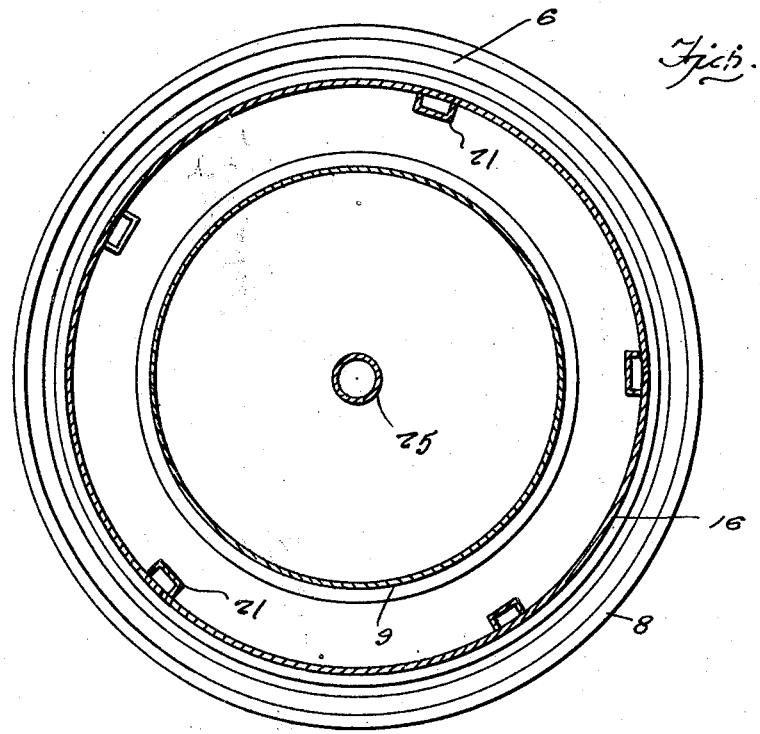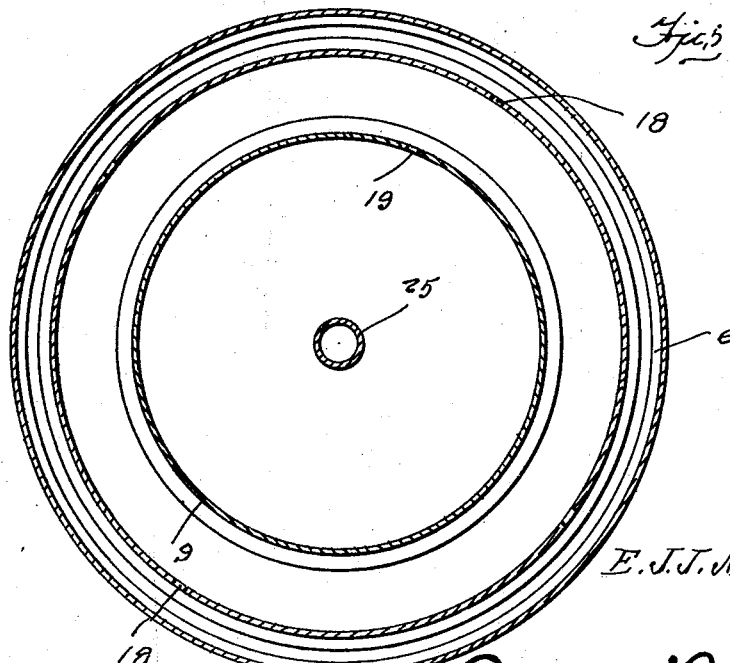

Patented Dec. 30, 1930

1,787,015

UNITED STATES PATENT OFFICE

ELMER J. J. MUELLER, OF JEFFERSON BARRACKS, MISSOURI

POULTRY DRINKING FOUNTAIN

Application filed May 9, 1929. Serial No. 361,614.

The present invention relates to a poultry drinking fountain and has for its prime object to provide a device of this nature with a storage compartment for water and a trough to which the water is fed from the storage compartment in such a manner as to maintain the water at a predetermined level in the trough at all times.

Another very important object of the invention resides in the provision of a poultry drinking fountain of this nature which is simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a vertical central section through the structure embodying the features of my invention, Figure 2 is a horizontal section therethrough taken substantially on the line 2—2 of Figure 1, Figure 3 is another horizontal section taken substantially on the line 3—3 of Figure 1, Figure 4 is a side elevation thereof.

Referring to the drawing in detail it will be seen that the numeral 5 denotes a circular plate forming a bottom with a wall 6 of annular formation rising from the edges thereof and connected thereto by a water tight seam 7. The wall 6 flares outwardly and at the upper edge is formed with a rolled bead 8.

A cylindrical drum 9 rises from the bottom 5 and is spaced inwardly from the wall 6. This drum 9 is provided at its lower edge with an annular outwardly directed flange 10 soldered or otherwise secured to the bottom 5.

A top 11 is provided on the upper end of the drum being connected thereto by a water tight seam 12. This top has a central opening 14 and a plurality of vent openings 15 spaced from the center opening 14 and the seam 12.

An outer drum 16 of cylindrical formation rises from the bottom 5 between the wall 6 and the drum 9 and is formed with an annular outwardly directed flange 17 at its bottom end soldered or otherwise secured to the bottom 5. The space between the walls 6 and the drum 16 forms the drinking trough for the poultry.

The drum 9 is provided with a plurality of openings 18 leading into this trough, said openings being spaced intermediate the upper edge of the wall 6 and the bottom 5. Similar openings 19 are formed in the lower portion of the drum 9.

The drum 16 is provided with vent openings 20 spaced upwardly from the openings 18 and below the upper edge of the wall 6. Downwardly tapering channel members 21 are fixed to the inner surface of the drum 16 and communicates with the openings 20 in a manner to permit air to escape from the drum 9 when filling the same, said air passing through the holes 15 in the top of said drum.

A top 22 is mounted on the upper end of the drum 16 by means of a water tight seam 23 and is formed with a central opening 24 registering with the opening 14. A pipe or tube 25 extends through the opening 14 and 24 and is fixed therein.

This pipe 25 terminates a slight distance above the bottom 5 at its lower end and at its upper end terminates a slight distance above the top 22. The pipe is formed with an opening 26 immediately above the top 22. A cylindrical wall 27 rises from the top 22 concentric with the opening 24 and the pipe 25.

A cone shaped cover 28 has a cylindrical wall 29 mounted therein to telescope inside the wall 27. A handle 30 rises from the apex of the cone shaped cover 28.

By removing the cover 28 water may be poured into the cylindrical wall 27 and will flow down through the pipe 25 to fill the drum 9 and the opening 26 permits the water to drain from the cylindrical wall 27 after the filling process has been completed.

The cover 28 is then placed on the top 22 with its wall 29 telescoped in the wall 27.

It will be seen that because of vent openings 15, vent panel members 21 and vent openings 20 air in the drum 9 will escape therefrom and permit the water level to rise when filling the same. The water from the drum 9 flows through the holes 19 and 18 into the trough and rises therein until the holes 20 are closed thereby and a liquid seal is thus provided which stops the flow of water from the drum 9 until the level thereof in the trough again falls below the holes 20 at which time air passes through said holes 20, the channel members 21 and openings 15 into the drum 9 and permit more water to discharge therefrom into the trough.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a bottom, a wall rising from the outer edge of the bottom, an inner drum rising from the bottom, an outer drum rising from the bottom, said inner drum being provided with openings below the level of the upper edge of the wall, said outer drum being provided with openings below the level of the upper edge of the wall, a top mounted on the upper end of the inner drum and having vent openings, a top mounted on the upper end of the outer drum, said outer drum provided with vent openings in the lower portion thereof below the level of the upper edge of the wall, a pipe leading through the centers of the tops and terminating a slight distance above the bottom and below the level of the upper edge of the wall, channel members fixed to the interior of said outer drum to receive air from the vent openings in the outer drum, said channel members terminating a slight distance below the top on the outer drum.

2. A device of the class described comprising a bottom, a wall rising from the outer edge of the bottom, an inner drum rising from the bottom, an outer drum rising from the bottom, said inner drum being provided with openings below the level of the upper edge of the wall, said outer drum being provided with openings below the level of the upper edge of the wall, a top mounted on the upper end of the inner drum and having vent openings, a top mounted on the upper end of the outer drum, said outer drum provided with vent openings in the lower portion thereof below the level of the upper edge of the wall, a pipe leading through the centers of the tops and terminating a slight distance above the bottom and below the level of the upper edge of the wall, channel members fixed to the interior of said outer drum to receive air from the vent openings in the outer drum, said channel members terminating a slight distance below the top on the outer drum, a cone shaped cover resting on the top of the outer drum, a cylindrical wall rising from the top of the outer drum, a cylindrical wall depending from the cover and telescoped into the cylindrical wall first mentioned.

3. A device of the class described comprising a bottom, a wall rising from the outer edge of the bottom, an inner drum rising from the bottom, an outer drum rising from the bottom, said inner drum being provided with openings below the level of the upper edge of the wall, said outer drum being provided with openings below the level of the upper edge of the wall, a top mounted on the upper end of the inner drum and having vent openings, a top mounted on the upper end of the outer drum, said outer drum provided with vent openings in the lower portion thereof below the level of the upper edge of the wall, a pipe leading through the centers of the tops and terminating a slight distance above the bottom and below the level of the upper edge of the wall, channel members fixed to the interior of said outer drum to receive air from the vent openings in the outer drum, said channel members terminating a slight distance below the top on the outer drum, a cone shaped cover resting on the top of the outer drum, a cylindrical wall rising from the top of the outer drum, a cylindrical wall depending from the cover and telescoped into the cylindrical wall first mentioned, a drain opening formed in the pipe immediately above the outer surface of the top of the upper drum.

In testimony whereof I affix my signature.

ELMER J. J. MUELLER.